Figure 5:
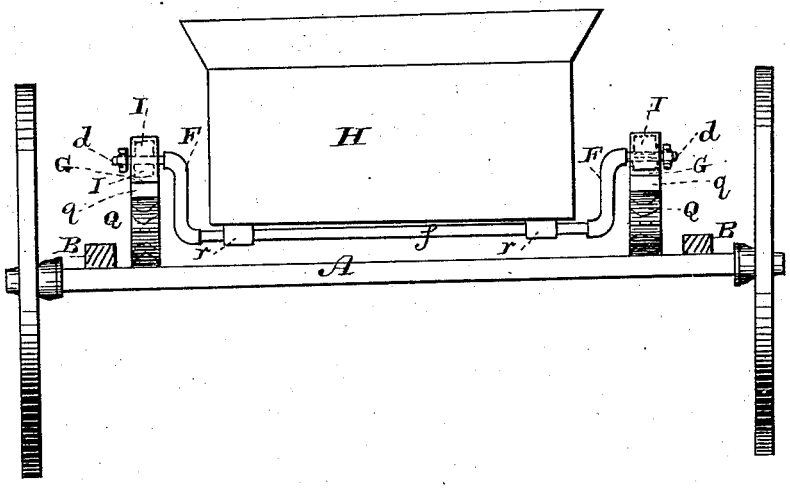

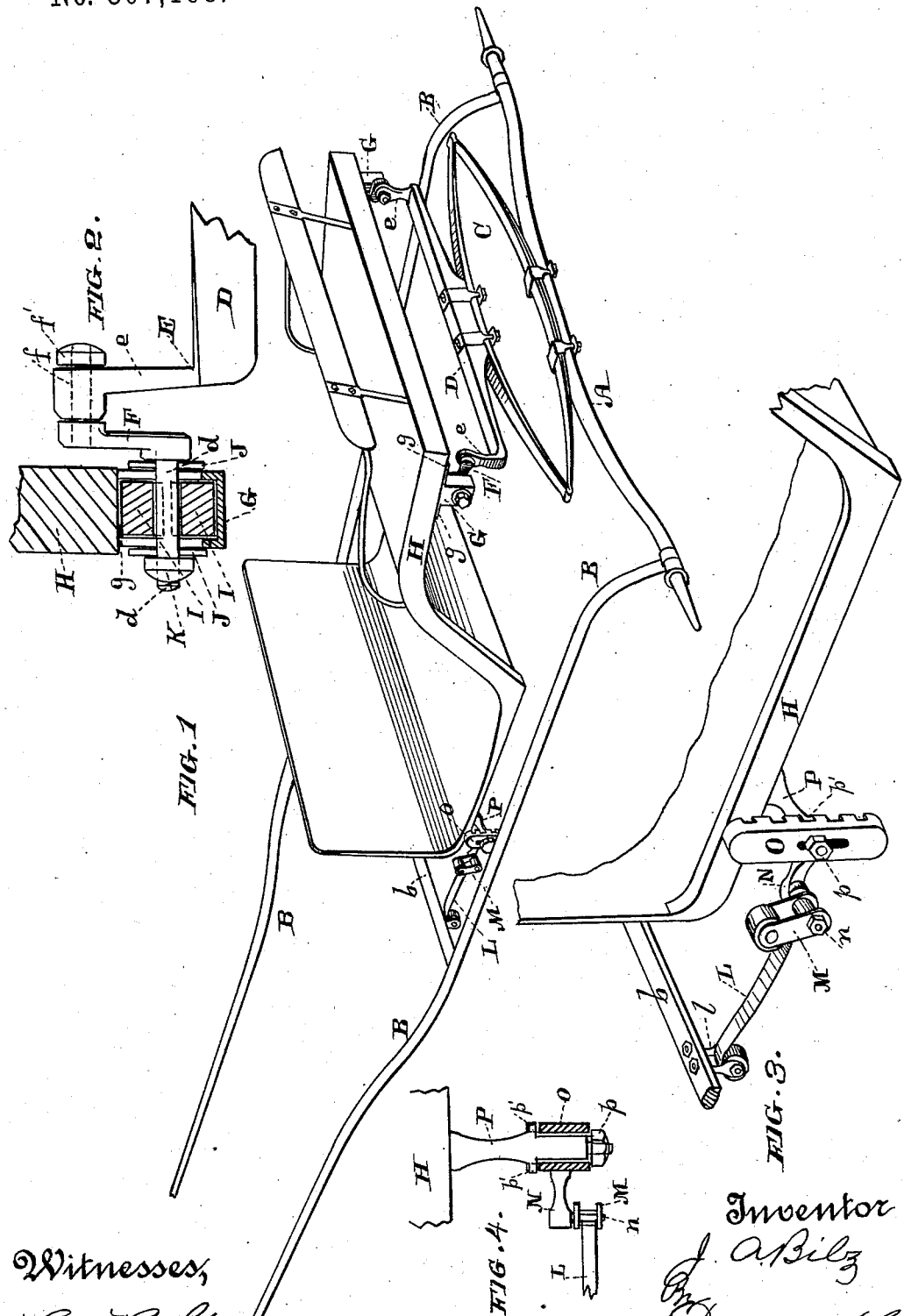

(No Model.)

2 Sheets—Sheet 2.

J. A. BILZ.

TWO WHEELED VEHICLE.

No. 307,168.  Patented Oct. 28, 1884.

Witnesses,
Geo. H. Strong
J. S. Touse

Inventor,
J. A. Bilz
By Dewey & Co.
Attorneys

UNITED STATES PATENT OFFICE.

JOHN A. BILZ, OF PLEASANTON, CALIFORNIA.

TWO-WHEELED VEHICLE.

SPECIFICATION forming part of Letters Patent No. 307,168, dated October 28, 1884.

Application filed March 31, 1884. (No model.)

*To all whom it may concern:*

Be it known that I, JOHN A. BILZ, of Pleasanton, county of Alameda, and State of California, have invented an Improvement in Two-Wheeled Vehicles; and I hereby declare the following to be a full, clear, and exact description thereof.

My invention relates to the class of two-wheeled vehicles; and it consists in certain new and useful improvements therein. These improvements consist in the arrangement of spring supports for the body, in a novel means of supporting the body from the spring, and in a peculiar device for leveling the body, all of which I shall fully explain.

The object of my invention is to provide a simple and easy-riding cart.

Referring to the accompanying drawings, Figure 1 is a perspective view of my vehicle, the wheels being omitted. Fig. 2 is a detail section showing the connection between the bar D and body. Fig. 3 is a perspective view showing the connection between the front of the body and the cross-bar of the shafts. Fig. 4 is a horizontal section and plan of same. Fig. 5 is a rear view showing the application of my double-pivot swing-joint to a vehicle having side springs.

A is the axle, and B are the shafts, clipped solidly to the axle. Upon the axle is clipped the elliptical spring C in line with it. Upon the spring C is clipped the spring-bar D. From the ends of this bar the rear portion of the body H is supported by means of a double-pivot swing joint or connection, whereby the body is left free to steady itself and counteract both the vertical motion of the spring to the required extent and also the oscillating motion derived from the shafts and axle. This connection is made as follows: Upon each end of the bar are secured irons E, having upturned ends $e$, Fig. 2. F are short arms, having projecting at right angles from one end pins or bolts $f$, which pass loosely through the tops of ends $e$, and are held therein by nuts $f'$. From the other ends of these arms extend at right angles short bolts or pins $d$.

G are boxes having arms $g$ at right angles, forming supports for the body H, to which said arms are bolted underneath. These boxes are formed in castings, and consist of a socket bounded on its edges, bottom, and sides by flanges for the reception and retention of the buffers or rubber cushions I. These buffers in each box are in two parts, with grooved meeting edges, and form bearings for the short bolts $d$, which are journaled therein, the lower buffer resting between the bolt and the bottom of the box, and the upper buffer lying between the bolt and the body of the vehicle. These buffers take off any jar there may be. The journals thus formed are steadied by washers J on each side of the boxes, and they are tightened up by nuts K on the ends of the bolts, which are threaded for their reception. The forward portion of the body may be supported from the cross-bar $b$ of the shafts in any suitable manner, as by loosely-playing links or straps, or, as I have here shown, by the springs L and links M, which have been secured to me in a former patent, Fig. 3; but in connection with these devices I now have the following point of novelty—namely, the means by which I level the body. The springs L are secured to the cross-bar $b$ by the short bearings or lugs $l$. Their rear ends are connected with the links M, the other ends of which are pivoted on pins $n$, extending from arms N, which project from the side of the vertical slotted racks O. Arms P are secured under the body and extend sidewise, their ends being threaded and projecting through the slotted racks O, taking nuts $p$, by which they are secured. These arms P have side flanges, $p'$, which fit the notches on the inner edges of the slotted racks. By fitting these flanges in the upper notches the front of the body is raised, and by fitting them in the lower notches it is depressed, thus enabling me to level the body at will. The disengagement and re-engagement of the flanges with the racks is readily effected by forcing them apart, or by allowing them to spring together.

The double-pivot swing-connection I have shown in Fig. 2, which consists of pivoting the parts to be connected at opposite ends of an arm, is not only useful in its application to the cart arranged as in said figure, but is also adapted for other arrangements, and especially for such as I show in Fig. 5. Here there are the two usual side springs, Q. Upon them are the blocks $q$, to which are bolted the boxes G, in which are journaled the short bolts $d$ of the arms F. The bolts $f$ at the other ends of the arms are pivoted in the sockets $r$, bolted under the body, and which correspond to the ends $e$ in Fig. 2. These bolts may be separate ones— one on each side—or they may be lengthened and joined in one continuous transverse rod under the body, as shown. This connection is the reverse of the one shown in Fig. 2, as far as the relation of the body and springs is concerned, for in the previous figure the body is pivoted on the bolts $d$ and the spring bar or block on the bolts $f$, while in the latter figure the body is pivoted on the bolts $f$ and the spring-block on the bolts $d$.

The employment of a single main spring at the back of the vehicle simplifies and cheapens the construction. The connection between it and the body permits the most perfect independence of the body to counteract all disagreeable motion and render it easy and comfortable to ride in, and the leveling device at the front adapts the vehicle for high or low horses and for different weights of riders.

Having thus described my invention, what I claim as new, and desire to secure by Letters Patent, is—

1. In a two-wheeled vehicle, the shaft B, axle A, springs C, having bar D, and body H, supported in front, in combination with the mechanism by which it is supported at the back, consisting of the irons E on the bar D, and having socket ends $e$, the cushioned bearings or boxes G, bolted under the body, and the arms F, having pins or bolts $f$ and $d$, journaled, respectively, in the socket-bearing $e$ and cushioned bearings G, substantially as herein described.

2. In a two-wheeled vehicle the body of which can be moved on a pivotal axis independent of the shafts, the springs L, secured to the cross-bar of the shafts, the slotted racks O, having arms N, and the links M, connecting said arms with the springs L, in combination with the arms P, secured to the body, and having flanges $p'$ engaging with the racks, all arranged and operating substantially as herein described.

In witness whereof I have hereunto set my hand.

JOHN A. BILZ.

Witnesses:
S. H. NOURSE,
C. D. COLE.